United States Patent
Sekiya

(10) Patent No.: US 6,811,089 B2
(45) Date of Patent: Nov. 2, 2004

(54) PORTABLE ELECTRONIC MEDIUM ISSUING SYSTEM AND ISSUING METHOD AND PORTABLE ELECTRONIC MEDIUM

(75) Inventor: Satoshi Sekiya, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/241,834

(22) Filed: Sep. 12, 2002

(65) Prior Publication Data

US 2004/0000593 A1 Jan. 1, 2004

(30) Foreign Application Priority Data

Jun. 28, 2002 (JP) ......................................... 2002-190886

(51) Int. Cl.⁷ .............................................. G06K 19/00
(52) U.S. Cl. ..................................... 235/487; 235/492
(58) Field of Search ................................. 235/387, 487, 235/492

(56) References Cited

U.S. PATENT DOCUMENTS 5,479,512 A 12/1995 Weiss
6,501,163 B1 * 12/2002 Utsumi ....................... 257/679

2002/0012398 A1 * 1/2002 Zhou et al.
2002/0029091 A1 * 3/2002 Seno et al.
2003/0028699 A1 * 2/2003 Holtzman et al.

FOREIGN PATENT DOCUMENTS

| DE | 101 13 829 A 1 | 9/2002 |
| EP | 1 139 279 A2 | 10/2001 |
| FR | 2 730 330 | 8/1996 |
| FR | 2 786 635 | 6/2000 |
| JP | 2000-137776 | 5/2000 |

* cited by examiner

*Primary Examiner*—Karl D. Frech
(74) *Attorney, Agent, or Firm*—Pillsbury Winthrop LLP

(57) ABSTRACT

A portable electronic medium, a portable electronic medium issuing system which issues the portable electronic medium and an issuing method, the portable electronic medium being configured to receive data from a host apparatus by serial communication and having a ROM storing a decompression program which is used for decompressing compressed data included in transmission data supplied from the host apparatus at the time of issuance, a RAM, a data memory, and processor which decompresses the compressed data of the transmission data that the host apparatus provides at the time of issuance by the decompression program stored in the ROM and which stores decompressed data in the RAM and stores definition information and program data in the data memory.

4 Claims, 9 Drawing Sheets

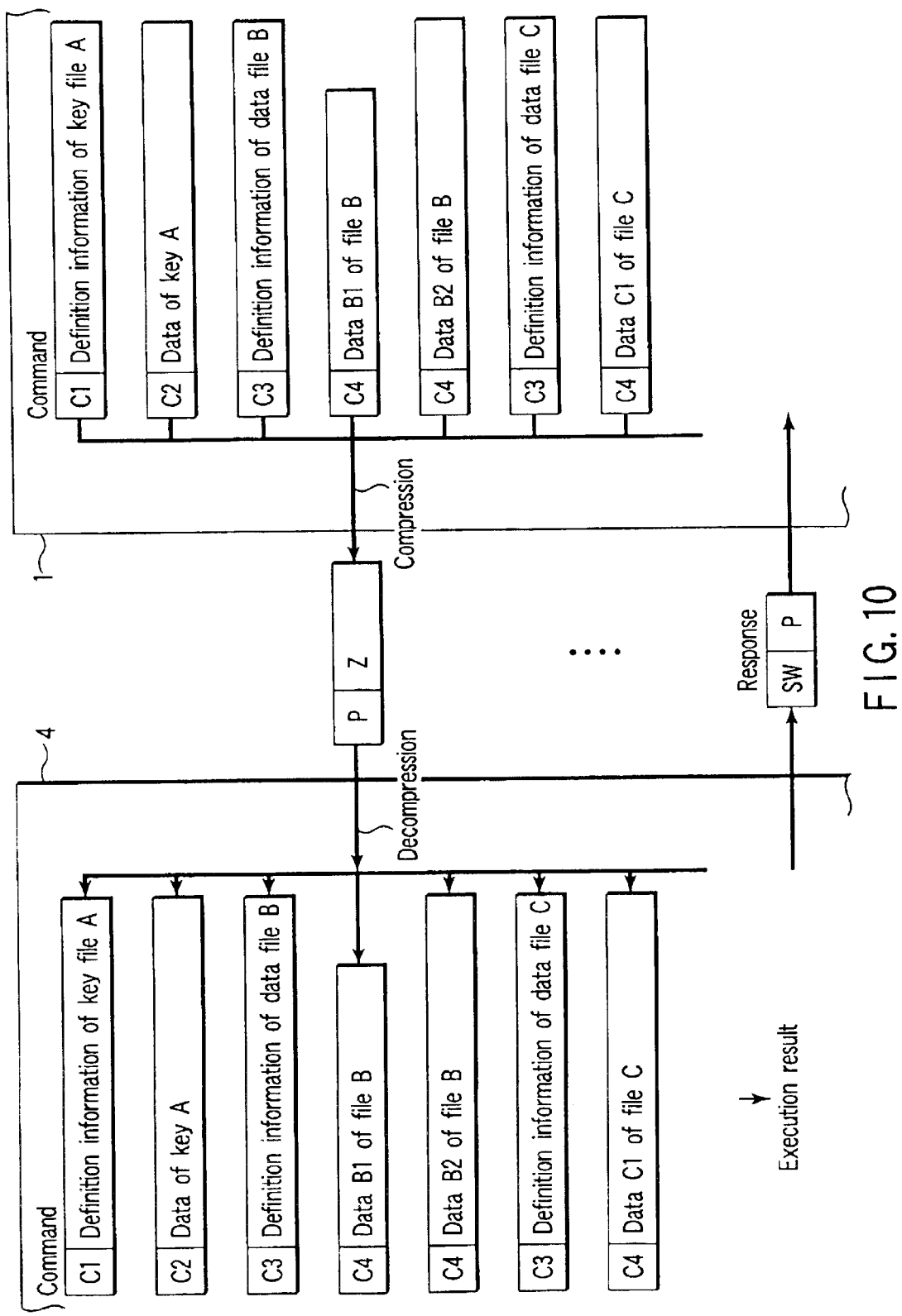
F I G. 10

PORTABLE ELECTRONIC MEDIUM ISSUING SYSTEM AND ISSUING METHOD AND PORTABLE ELECTRONIC MEDIUM

CROSS-REFERENCE TO RELATED APPLICATIONS

This application is based upon and claims the benefit of priority from the prior Japanese Patent Application No. 2002-190886, filed Jun. 28, 2002, the entire contents of which are incorporated herein by reference.

BACKGROUND OF THE INVENTION

1. Field of the Invention

This invention relates to a technique for enhancing the operation speed of a portable electronic medium which is generally called an IC card.

2. Description of the Related Art

An IC card is set into a serviceable state by defining necessary key files, data files and the like on a nonvolatile memory provided inside the IC card according to the service objectives and applications and writing data into the above files.

The above process is generally called "issuance".

In the IC card, a function which executes instructions to issue the IC card itself is prepared, and generally, one file can be defined and data of one unit can be written by executing one instruction.

Issuance of the IC card is made by sequentially executing instructions of a number corresponding to the number of necessary files and data items.

Therefore, when an IC card is issued, instructions used to define files and instructions used to write data as described above are adequately combined and executed, and thus, definition information and data are written on the nonvolatile memory in the IC card each time the instruction is executed.

However, in the above instructions, information such as instruction codes and transmission control information required for communication are contained in addition to information written in the nonvolatile memory.

As a result, information which is redundant in comparison with information to be really written into the nonvolatile memory is transmitted to the card.

Further, generally, the IC card receives an instruction from the exterior via a relatively low speed serial interface or sends a response to the instruction.

The speed is generally only 9600 bits/sec in a normal contact type IC card.

Therefore, in the issuing process for transmitting/receiving redundant data as described before, time required for the transmission process becomes extremely long.

Next, the instruction executing procedure with respect to an IC card in the conventional IC card issuing process is explained.

That is, instructions which define key files and data files on the nonvolatile memory in the IC card and instructions used to write data into the above files are sequentially executed in a predetermined order.

Each instruction is configured by a combination of an instruction code, attached information (such as definition information of the file and data itself to be written) and protocol control information used to perform serial communication.

Further, each time execution of one instruction is terminated, a response code expressing the result of execution is output from the IC card together with the protocol control information.

Thus, conventionally, there occurs a problem that an extremely long time is required for the communication process and time required for issuing an IC card becomes long since a large number of redundant instructions are supplied to the card via the low-speed interface in the IC card issuing process.

BRIEF SUMMARY OF THE INVENTION

An object of this invention is to provide a portable electronic medium and a portable electronic medium issuing system and issuing method in which a host device and a portable electronic medium are coupled by serial communication and which issue a portable electronic medium by transmitting a series of instructions from the host device to the portable electronic medium, can shorten time for transmission of the series of instructions by data-compressing and transmitting the series of instructions and reduce time for an issuing process.

A portable electronic medium of this invention in which application data is stored in a nonvolatile memory based on a plurality of instructions supplied from an external device by serial communication and which performs processes by use of the stored application comprises decompression means for expanding or decompressing compressed data of at least each instruction message from the external device, and storage means for storing an execution result of the instruction message decompressed by the decompression means in the nonvolatile memory.

In a portable electronic medium issuing system of this invention in which a host device and a portable electronic medium are coupled by serial communication and which includes a nonvolatile memory used to store files and file control information according to a plurality of issuance instruction messages from the host device, the host device includes first creation means for creating a plurality of instruction messages for issuance of a portable electronic medium and transmission means for compressing at least each instruction message created by the first creation means and transmitting the compressed instruction message to the portable electronic medium, and the portable electronic medium includes decompression means for expanding or decompressing compressed data of at least each instruction message supplied from the host device and storage means for storing files and file control information according to the instruction message decompressed by the decompression means into the nonvolatile memory.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 10 is a diagram for illustrating a command message, compressed data of the message and a response message in the card issuing process.

DETAILED DESCRIPTION OF THE INVENTION

There will now be described an IC card issuing system as an IC card processing system of this invention with reference to the accompanying drawings.

Figure 1:
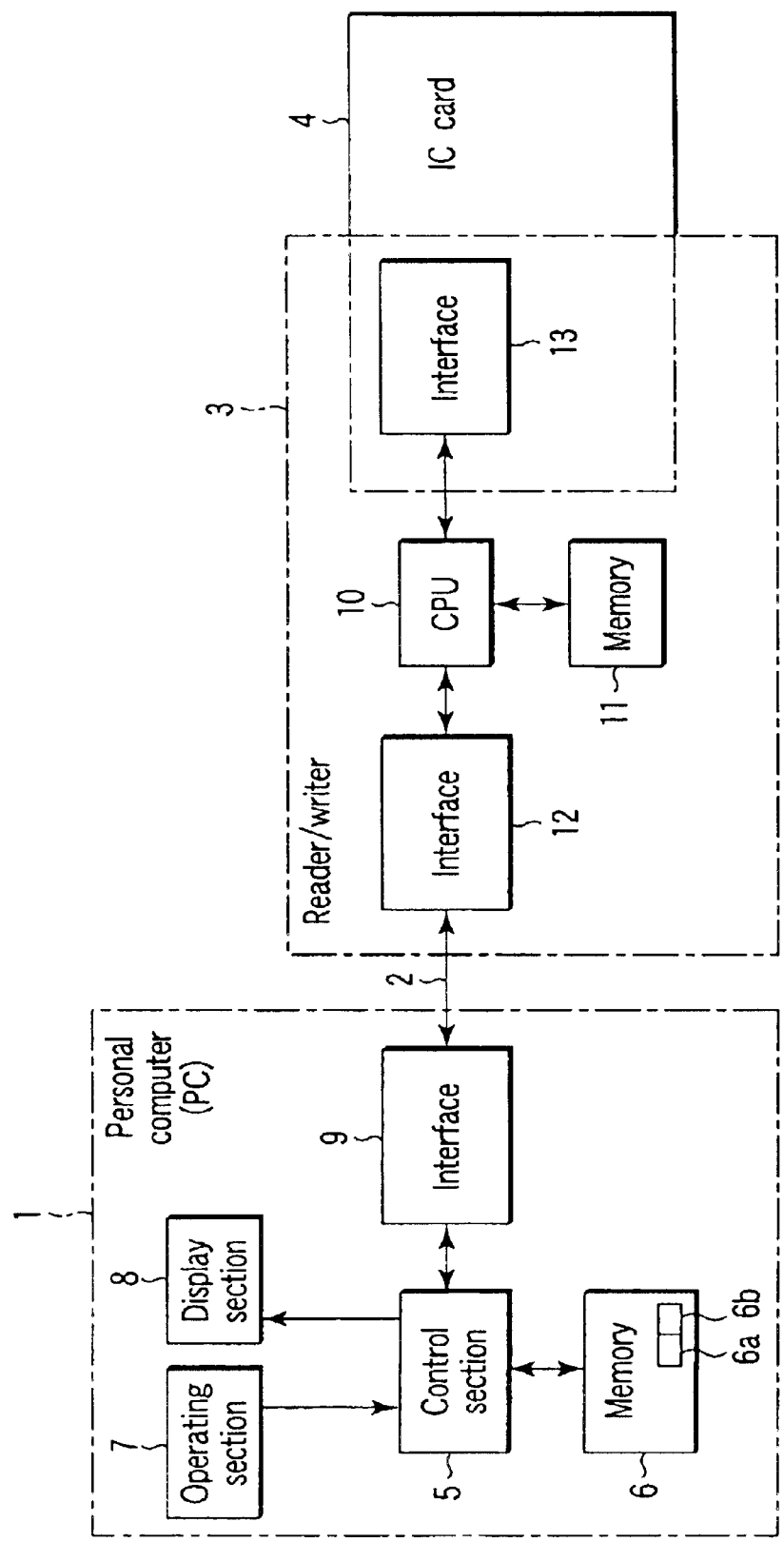
FIG. 1 is a block diagram schematically showing an example of the configuration of an IC card issuing system according to one embodiment of this invention.

As shown in FIG. 1, an IC card issuing system includes a personal computer (PC) 1 as a host device and a reader/writer 3 connected to the PC 1 via a communication line 2. An IC card 4 as a to-be-issued card connected via a connector (not shown) is to be mounted on the reader/writer 4.

The PC 1 includes a control section 5 which controls the whole PC 1, a memory 6 in which a control program is stored and various data items are to be stored, an operating section 7 such as a keyboard used to issue operation instructions, a display section 8 which displays operation guidance and the like, and an interface 9 which transfers data with respect to the reader/writer 3.

The control section 5 has a function of authenticating a master key stored in the memory 6 as a secret key with respect to a manufacture's serial number (card inherent information) supplied from the IC card 4.

The control section 5 includes an internal memory 5a which has the same storage structure as a data memory 17 used as an EEPROM of the IC card 4 which will be described later and is of 8 k-byte configuration, for example.

In the memory 6, a program 6a which creates issuing messages to be sequentially transmitted to the IC card 4 for respective card types to be issued and a program 6b which compresses the created issuing messages are stored.

The issuing message includes transmission data, command code and protocol control information necessary for serial communication, and a head code and end code are attached thereto. As the command codes, there are provided C1: definition of a key file A, C2: writing of key data, C3: definition of a data file, and C4: writing of data.

The control section 5 compresses an issuing message as issuing data and transmits the compressed data to the IC card 4 via the reader/writer 3.

The reader/writer 3 includes a CPU 10 which controls the reader/writer 3, a memory 11 in which a control program is stored and various data items are to be stored, an interface 12 which transfers data with respect to the PC 1, and an interface 13 which transfers data with respect to the IC card 4. Further, the reader/writer 3 has a detector (not shown) which detects insertion of the IC card 4 and outputs the detection result to the PC 1. Further, the reader/writer 3 may be designed to read the contents of the IC card 4 when insertion of the IC card 4 is detected and output data indicating whether or not the card is an issuing card in which an application and the like are not yet recorded to the PC 1.

Figure 2:
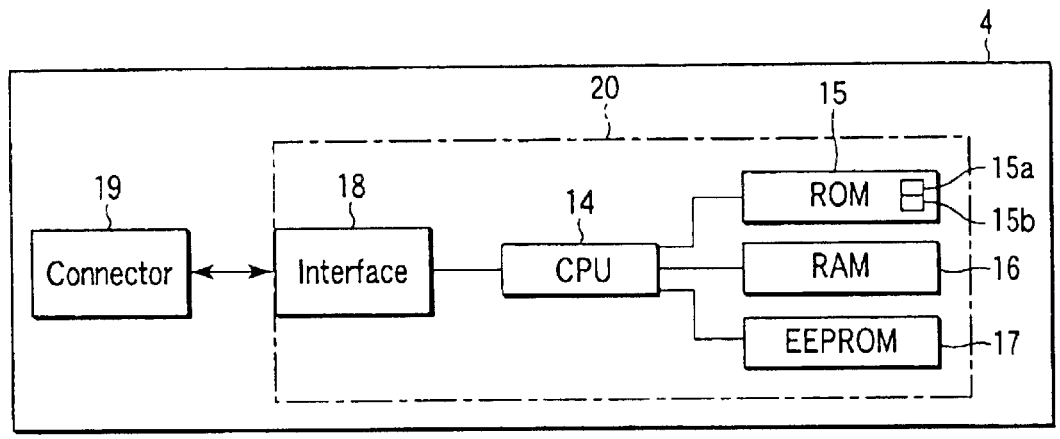
FIG. 2 is a block diagram schematically showing an example of the configuration of an IC card.

As shown in FIG. 2, the IC card 4 includes a CPU (control element) 14 which controls the IC card 4, a ROM (program memory) 15 in which a control program for the internal operation of the card is stored, a RAM (working memory, volatile memory) 16 used as a transmission/reception buffer of messages which are to be exchanged with respect to the exterior (reader/writer 3) and a temporary storage buffer of data which is being processed by the CPU 14, a data memory (nonvolatile memory) 17 configured by an EEPROM in which operation data used by reading/writing the contents thereof according to an application is stored and a manufacture's serial number or the like inherent to the card as message concealing key data (realized by use of a master key which will be described later) is stored, an interface 18 which transfers data with respect to the reader/writer 3, and a contact portion 19.

The IC card 4 receives an instruction from the exterior via a relatively low speed serial interface or sends a response with respect to the instruction and the speed thereof is generally 9600 bits/sec in a normal contact type IC card.

The CPU 14, ROM 15, RAM 16, data memory 17, interface 18 are configured by an IC chip 20, the contact portion 19 and IC chip 20 are integrally formed in a module and buried in the main body of the IC card.

In the ROM 15, a decompression program 15b which decompresses or expands compressed data from the PC 1 is registered. The decompression program 15b decompresses or expands compressed data from the PC 1 into an original instruction message. For example, a message of protocol control information, command code or transmission data is restored.

In the ROM 15, a command search table 15a in which CLA, INS and the like are registered is provided. In the command search table 15a, the type of command message based on the command code is registered.

When receiving a command message, the CPU 14 searches the command search table 15a to determine the type of command message, based on a command code attached thereto.

In the RAM 16, an access condition flag indicating that an access right is set up is provided and is set by collation or authentication of a key.

Figure 3:
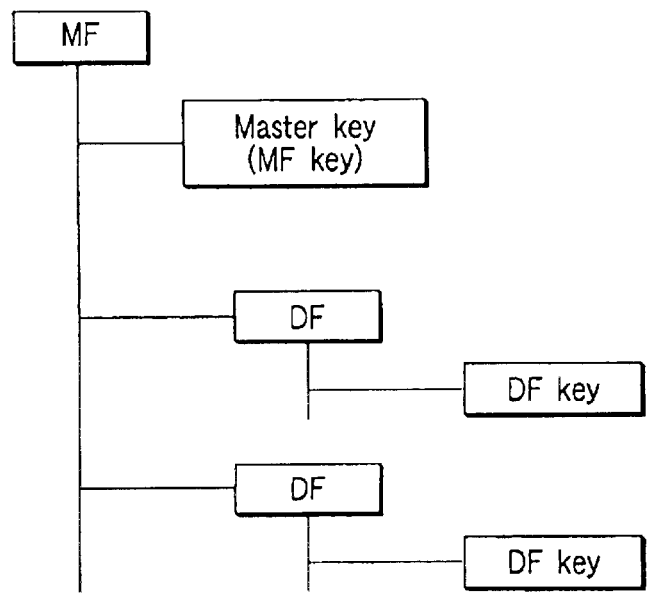
FIG. 3 is a diagram showing one example of a file structure in a data memory of the IC card.

FIG. 3 shows one example of a file structure in the data memory 17.

FIG. 3 shows the file structure in the data memory 17 of the IC card 4 and the main folder (MF) is set at the center, a master key (MF key) for issuance and a plurality of data folders (DF) are branched from the main folder (MF) and DF keys are branched from the respective data folders (DF).

Figure 4:
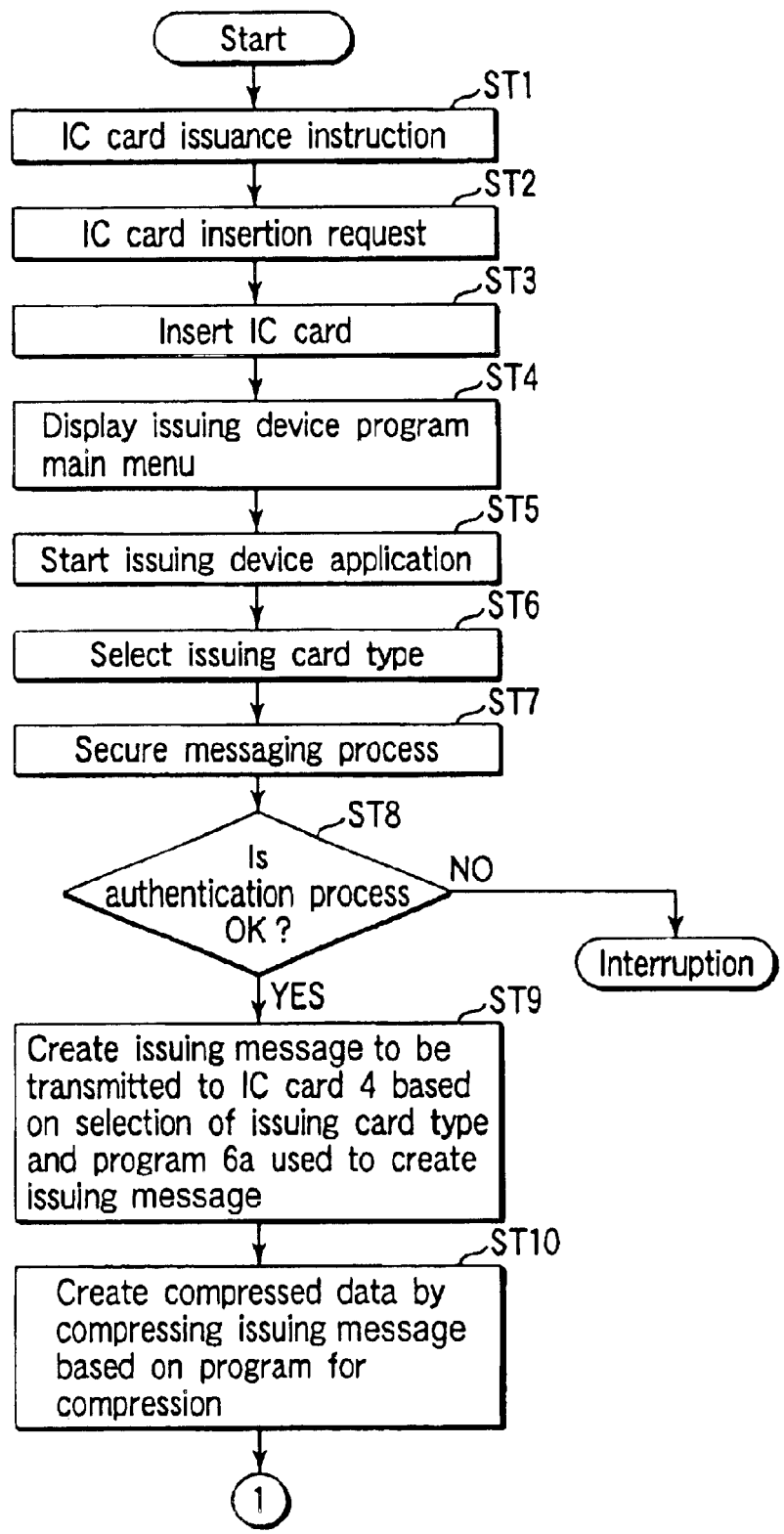
FIG. 4 is a flowchart for illustrating the card issuing process.
Figure 5:
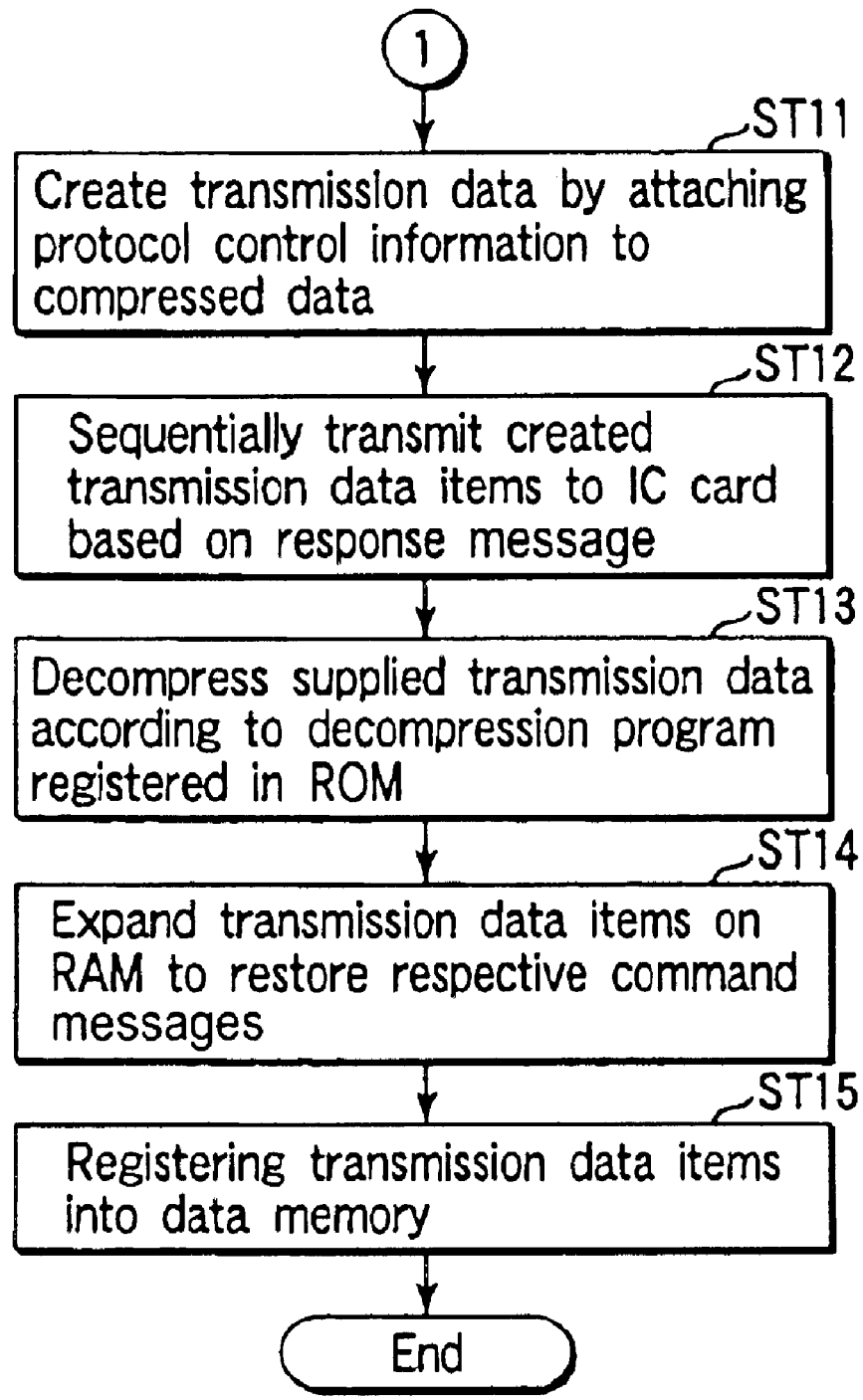
FIG. 5 is a flowchart for illustrating the card issuing process.
Figure 6:
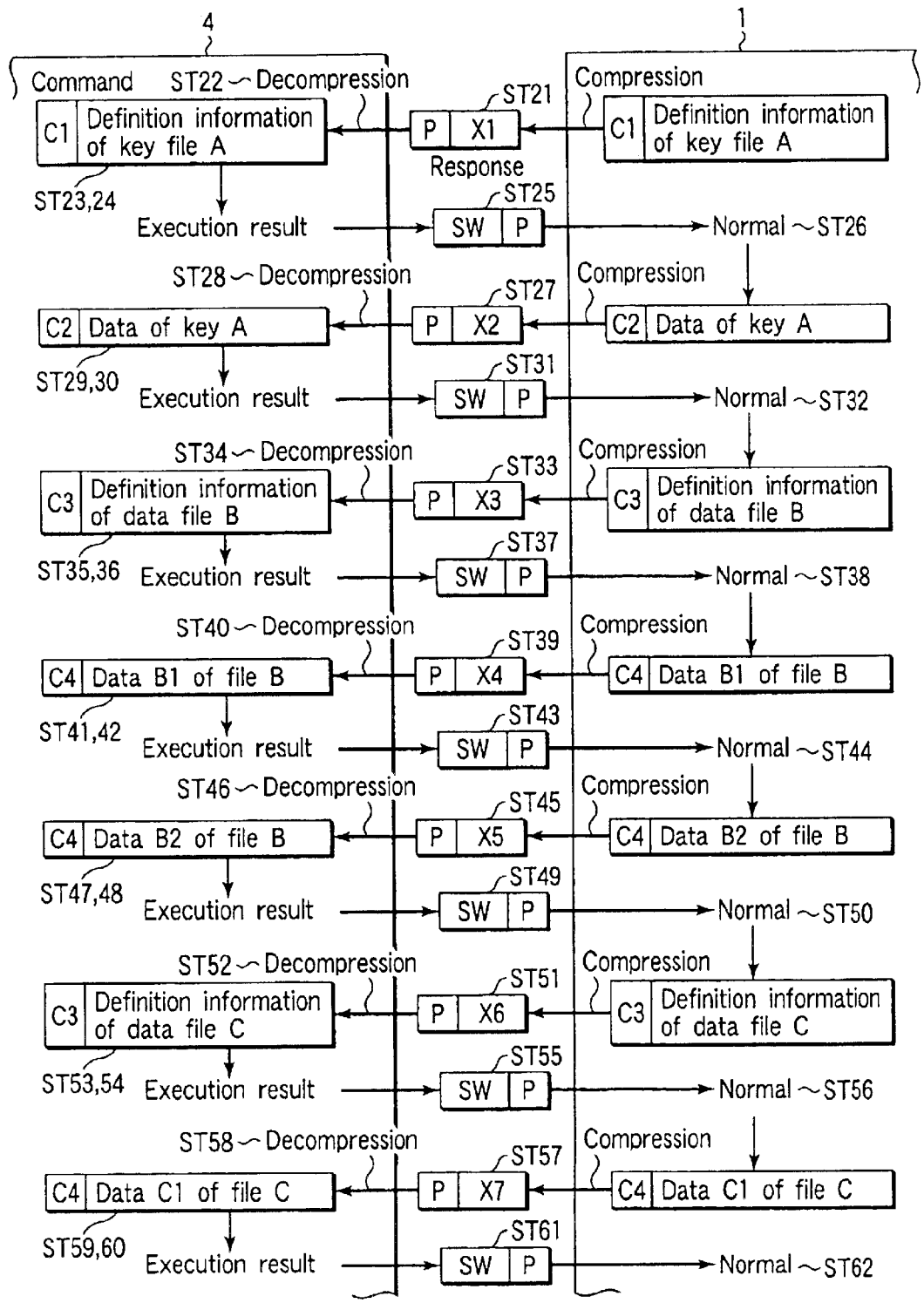
FIG. 6 is a diagram for illustrating a command message, compressed data of the message and a response message in the card issuing process.

Next, the issuing process of the IC card 4 is explained with reference to the flowcharts shown in FIGS. 4, 5 and the flow of the process shown in FIG. 6.

In this example, as data of the IC card 4, a manufacture's serial number stored in the data memory 17 when the IC chip is manufactured is used. Further, a master key (MF key) registered in the hardware module at the time of formation of the IC chip is used.

First, an issuing device icon on the screen of the display section 8 of the PC 1 is clicked (ST1). Then, the control section 5 determines issuance of an IC card and causes the display section 8 to display a request of inserting an issuing IC card 4 into the reader/writer 3 (ST2).

Based on the display contents, the issuing IC card 4 is inserted into the reader/writer 3 (ST3).

Then, the control section 5 causes the display section 8 to display an issuing device program main menu (ST4) based on an insertion detecting signal (output from the reader/writer 3 to the control section 5 of the PC 1) and starts an issuing device application (ST5). The type of issuing card is selected by use of the operating section 7 based on the menu display contents (ST6).

Next, the control section 5 performs a secure messaging process as the authentication process of the IC card 4 by use of the MF key (ST7).

As a result, when the IC card 4 is authenticated (ST8), the control section 5 creates an issuing message to be transmitted to the IC card 4 based on selection of the type of the issuing card and the program 6a (ST9), creates compressed data (X1, X2, . . . ) by compressing the issuing message based on the program 6b (ST10) and creates transmission data by attaching protocol control information P to the compressed data (ST11).

Figure 7A:
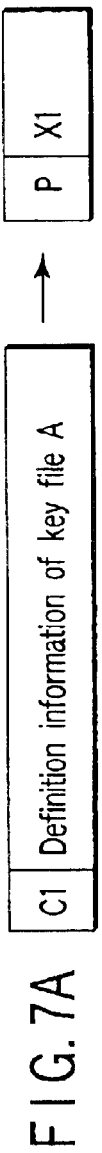
FIGS. 7A to 7G are diagrams showing examples of messages.

As shown in FIG. 7A, for example, compressed data X1 is created by compressing a first message in which a command C1 indicating the definition of the key file A is attached to definition information of the key file A and first transmission data is created by attaching protocol control information P to the compressed data X1.

Figure 7B:

As shown in FIG. 7B, compressed data X2 is created by compressing a second message in which a command C2 indicating writing of data of the key A is attached to the data of the key A and second transmission data is created by attaching protocol control information P to the compressed data X2.

Figure 7C:
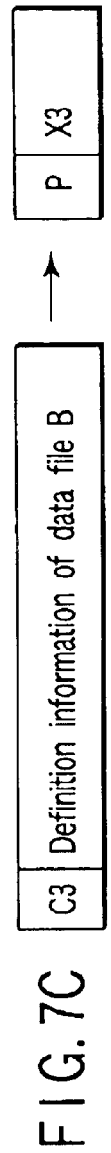

As shown in FIG. 7C, compressed data X3 is created by compressing a third message in which a command C3 indicating the definition of a data file B is attached to definition information of the data file (application program) B and third transmission data is created by attaching protocol control information P to the compressed data X3.

Figure 7D:
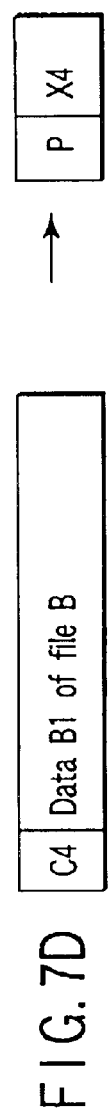

As shown in FIG. 7D, compressed data X4 is created by compressing a fourth message in which a command C4 indicating writing of data B1 of the data file B is attached to the data B1 of the data file B and fourth transmission data is created by attaching protocol control information P to the compressed data X4.

Figure 7E:

As shown in FIG. 7E, compressed data X5 is created by compressing a fifth message in which a command C4 indicating data B2 of the data file B is attached to the data B2 of the data file B and fifth transmission data is created by attaching protocol control information P to the compressed data X5.

Figure 7F:
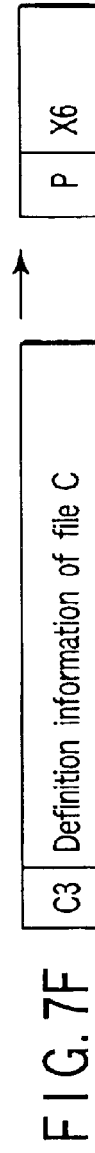

As shown in FIG. 7F, compressed data X6 is created by compressing a sixth message in which a command C3 indicating the definition of a data file C is attached to definition information of the data file C and sixth transmission data is created by attaching protocol control information P to the compressed data X6.

Figure 7G:

As shown in FIG. 7G, compressed data X7 is created by compressing a seventh message in which a command C4 indicating data C1 of the data file C is attached to the data C1 of the data file C and seventh transmission data is created by attaching protocol control information P to the compressed data X7.

The data items B1, C1 of the data files B, C are common data irrespective of the type and application of the IC card 4 and the data B2 of the data file B is data such information specific to each IC card 4.

For example, a bank transaction service processing application or credit transaction service processing application is formed by use of the data items B1, B2 of the data file B and a prepaid service processing application which does not require individual information is formed by use of the data C1 of the data file C.

Further, the control section 5 sequentially transmits the above created transmission data items to the CPU 14 of the IC card 4 via the reader/writer 3 based on a response message (ST12).

As a result, the CPU 14 of the IC card 4 decompresses or expands the sequentially supplied transmission data items according to the decompression program 15b registered in the ROM 15 (ST13) and expands the transmission data on the RAM 16 (ST14) to perform the process for restoring the respective command messages and registering them into the data memory 17 (ST15).

That is, the control section 5 transmits the first transmission data (P, X1) containing the compressed data of the first message to the CPU 14 of the IC card 4 via the reader/writer 3.

Thus, the CPU 14 of the IC card 4 decompresses the supplied first transmission data according to the decompression program 15b registered in the ROM 15 (ST22) and expands the transmission data on the RAM 16 (ST23) to perform the process for restoring a first command message which contains the command C1 indicating the definition of the key file and definition information of the key file A and registering the definition information of the key file A into the data memory 17 (ST24).

Further, the CPU 14 of the IC card 4 transmits first response data obtained by attaching protocol control information P to a response code SW corresponding to the result of the above registering process to the control section 5 of the PC 1 via the reader/writer 3 (ST25).

Then, when the first response data supplied corresponds to data obtained by the normal process (ST26), the control section 5 of the PC 1 transmits the second transmission data (P, X2) containing the compressed data of the second message to the CPU 14 of the IC card 4 via the reader/writer 3 (ST27).

As a result, the CPU 14 of the IC card 4 decompresses the second transmission data supplied according to the decompression program 15b registered in the ROM 15 (ST28) and expands the transmission data on the RAM 16 (ST29) to perform the process for restoring a second command message which contains the command C2 indicating writing of data of the key A and the data of the key A and registering the data of the key A into the data memory 17 (ST30).

Further, the CPU 14 of the IC card 4 transmits second response data obtained by attaching protocol control information P to a response code SW corresponding to the result of the above registering process to the control section 5 of the PC 1 via the reader/writer 3 (ST31).

Then, when the second response data supplied corresponds to data obtained by the normal process (ST32), the control section 5 of the PC 1 transmits the third transmission data (P, X3) containing the compressed data of the third message to the CPU 14 of the IC card 4 via the reader/writer 3 (ST33).

Thus, the CPU 14 of the IC card 4 decompresses the third transmission data supplied according to the decompression program 15*b* registered in the ROM 15 (ST34) and expands the transmission data on the RAM 16 (ST35) to perform the process for restoring a third command message which contains the command C3 indicating the definition of the data file B and definition information of the data file (application program) B and registering the definition information of the data file B into the data memory 17 (ST36).

Further, the CPU 14 of the IC card 4 transmits third response data obtained by attaching protocol control information P to a response code SW corresponding to the result of the above registering process to the control section 5 of the PC 1 via the reader/writer 3 (ST37).

Then, when the third response data supplied corresponds to data obtained by the normal process (ST38), the control section 5 of the PC 1 transmits the fourth transmission data (P, X4) containing the compressed data of the fourth message to the CPU 14 of the IC card 4 via the reader/writer 3 (ST39).

As a result, the CPU 14 of the IC card 4 decompresses the fourth transmission data supplied according to the decompression program 15*b* registered in the ROM 15 (ST40) and expands the transmission data on the RAM 16 (ST41) to perform the process for restoring a fourth command message which contains the command C4 indicating writing of the data B1 of the data file B and the data B1 of the data file B and registering the data of the key A into the data memory 17 (ST42).

Further, the CPU 14 of the IC card 4 transmits fourth response data obtained by attaching protocol control information P to a response code SW corresponding to the result of the above registering process to the control section 5 of the PC 1 via the reader/writer 3 (ST43).

Then, when the fourth response data supplied corresponds to data obtained by the normal process (ST44), the control section 5 of the PC 1 transmits the fifth transmission data (P, X5) containing the compressed data of the fifth message to the CPU 14 of the IC card 4 via the reader/writer 3 (ST45).

As a result, the CPU 14 of the IC card 4 decompresses the fifth transmission data supplied according to the decompression program 15*b* registered in the ROM 15 (ST46) and expands the transmission data on the RAM 16 (ST47) to perform the process for restoring a fifth command message which contains the command C4 indicating writing of data B2 of the data file B and the data B2 of the data file B and registering the data B2 of the data file B into the data memory 17 (ST48).

Further, the CPU 14 of the IC card 4 transmits fifth response data obtained by attaching protocol control information P to a response code SW corresponding to the result of the above registering process to the control section 5 of the PC 1 via the reader/writer 3 (ST49).

Then, when the fifth response data supplied corresponds to data obtained by the normal process (ST50), the control section 5 of the PC 1 transmits the sixth transmission data (P, X6) containing the compressed data of the sixth message to the CPU 14 of the IC card 4 via the reader/writer 3 (ST51).

As a result, the CPU 14 of the IC card 4 decompresses the sixth transmission data supplied according to the decompression program 15*b* registered in the ROM 15 (ST52) and expands the transmission data on the RAM 16 (ST53) to perform the process for restoring a sixth command message which contains the command C3 indicating the definition of the data file C and definition information of the data file C and registering the definition information of the data file C into the data memory 17 (ST54).

Further, the CPU 14 of the IC card 4 transmits sixth response data obtained by attaching protocol control information P to a response code SW corresponding to the result of the above registering process to the control section 5 of the PC 1 via the reader/writer 3 (ST55).

Then, when the sixth response data supplied corresponds to data obtained by the normal process (ST56), the control section 5 of the PC 1 transmits the seventh transmission data (P, X7) containing the compressed data of the seventh message to the CPU 14 of the IC card 4 via the reader/writer 3 (ST57).

As a result, the CPU 14 of the IC card 4 decompresses the seventh transmission data supplied according to the decompression program 15*b* registered in the ROM 15 (ST58) and expands the transmission data on the RAM 16 (ST59) to perform the process for restoring a seventh command message which contains the command C4 indicating writing of data C1 of the data file C and the data C1 of the data file C and registering the data C1 of the data file C into the data memory 17 (ST60).

Figure 8:
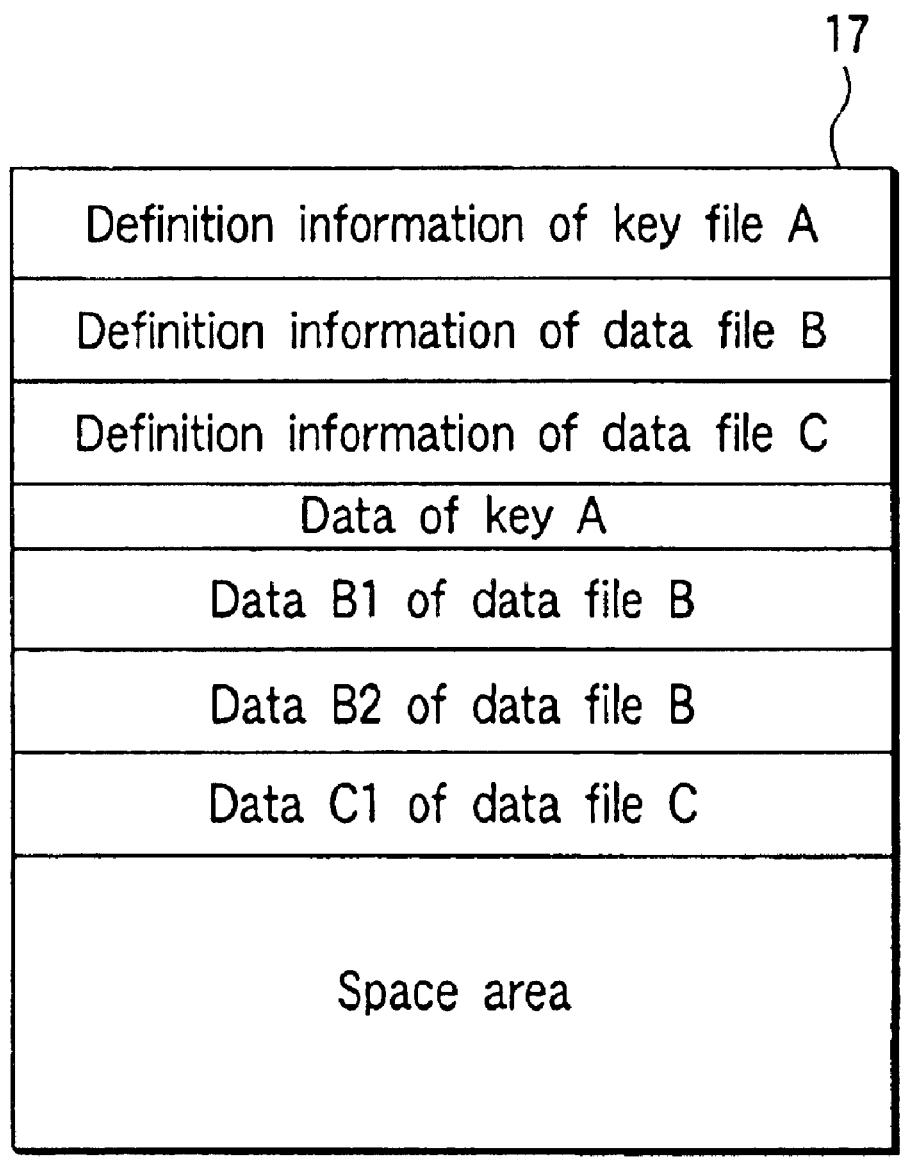
FIG. 8 is a diagram showing one example of a file structure in a data memory of the IC card.

As shown in FIG. 8, by registering data as described above, the definition information of the key file A, the definition information of the data file B, the definition information of the data file C, data of the key A, data B1 of the data file B, data B2 of the data file B, and data C1 of the data file C are stored in the data memory 17.

In this case, the basic processing program is previously stored in the ROM 15 at the time of manufacturing of the IC chip 20.

Further, the CPU 14 of the IC card 4 transmits seventh response data obtained by attaching protocol control information P to a response code SW corresponding to the result of the above registering process to the control section 5 of the PC 1 via the reader/writer 3 (ST61).

Then, when the seventh response data supplied corresponds to data obtained by the normal process (ST62), the control section 5 of the PC 1 terminates the issuing process.

Since the above response data (response code) is generally 2-byte data, no compression is made.

Further, the control section 5 of the PC 1 interrupts the issuing process in a case where a response message supplied from the IC card 4 as the result of the process indicates an abnormal case.

If authentication of the IC card 4 is not made (ST8), the issuing process is interrupted.

For example, if the transfer rate is 9,600 bits, the transfer time of 100 bytes is approximately 0.13 seconds and the transfer time of a command message of 200 bytes is approximately 0.25 seconds. If 100-byte data is compressed to 50-byte data, transferred and decompressed later, decompression time depends on the processing time (several milliseconds to several tens milliseconds) of the CPU 14, and consequently, the transfer time can be reduced to 0.07 seconds which is almost half the original value.

Therefore, it takes five minutes or more to issue one IC card 4 in the prior art, but it becomes possible to issue the IC card in half the time.

As described above, in a system in which the IC card issuing device and the IC card are coupled by serial communication and the IC card is issued by compressing and transmitting a message from the IC card issuing device, the message transmission time can be reduced (from several minutes to several tens seconds) and the issuance processing time can be reduced.

When the issuing process is performed, an instruction to be supplied to the IC card is pre-compressed and then transmitted to the IC card, and the IC card decompresses the data inside the card to restore original instruction data and execute the same.

Thus, the amount of data transmitted to the IC card is reduced by data compression so that time for the transmission process depending on low-speed communication which occupies a large part of issuance processing time can be reduced and the issuance processing time can be considerably reduced.

As a result, time required for the communication process can be reduced and the processing time for the whole issuing process can be considerably reduced.

That is, a series of instructions executed in the IC card issuing process is first compressed by use of the data compression technique and then transmitted to the IC card.

On the IC card side, the received data is decompressed and expanded on the internal working memory (RAM), restored to normal instructions and executed.

The compressed data decompressing process is newly performed on the IC card side, but the process can be performed at extremely high speed in comparison with the communication process with the exterior since the recent data compression technique is highly developed by the development of the technique in the communication field and the decompression process is an internal process performed by the CPU.

Therefore, it is expected to considerably reduce the processing time for the whole issuing process by reducing a communication amount by use of the above means.

(Other Embodiments)

Figure 9:
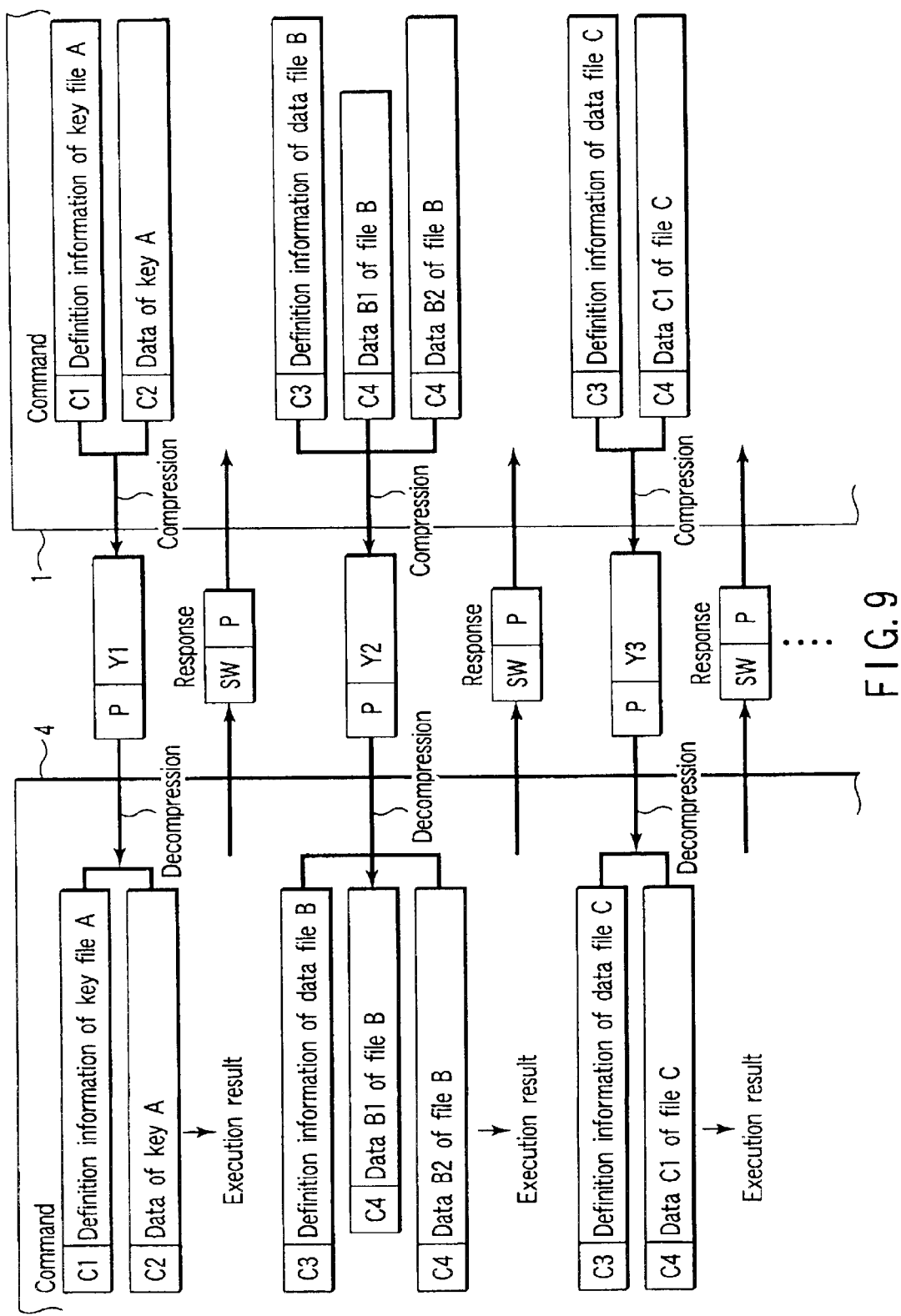
FIG. 9 is a diagram for illustrating a command message, compressed data of the message and a response message in the card issuing process.

Further, in the above embodiment, a case where each instruction message of the IC card issuing device is converted into compressed data and transmitted is explained, but this invention is not limited only to this case. For example, a plurality of instruction messages can be converted into compressed data for each group and transmitted as shown in FIG. 9 or all of the instruction messages used for issuance can be converted into compressed data and transmitted as shown in FIG. 10. In this case, on the decompression side, compressed data for each group of instruction messages is converted into individual instruction messages or compressed data corresponding to all of the instruction messages required for issuance is converted into individual instruction messages.

As a result, time required for the communication process can be reduced and the processing time for the whole issuing process can be considerably reduced.

Further, an amount of protocol control information attached to each instruction can be reduced and the communication processing time can be reduced accordingly by collectively compressing and transmitting a plurality of instructions.

When the instruction is compressed, a method for compressing each instruction, a method for collectively compressing each group of instructions or a method for collectively compressing all of the instructions can be selectively used.

Further, a case where a program used to decompress compressed data is stored in the program memory (ROM) in the IC card is explained, but it is also possible to write the program into a working memory (RAM) in the IC card from the PC 1 used as an external device (in the same manner as in a process for registering application data or the like) before the IC card issuing process.

In addition, in the above embodiment, a case where the instruction messages at the time of IC card issuance are previously collected and converted into compressed data before the message transmission process is performed is explained. However, this invention is not limited to this case and each instruction message can be subjected to the compression process when each instruction message is transmitted. Further, it is also possible to perform the compression process when a plurality of messages are collectively compressed and transmitted.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A portable electronic medium configured to receive data from a host apparatus by serial communication and having a ROM, a RAM and a data memory, said ROM storing a decompression program used for decompressing compressed data included in transmission data supplied from the host apparatus at the time of issuance, said portable electronic medium comprising:

first processing means for (i) decompressing the compressed data of the transmission data that the host apparatus provides at the time of issuance, by using the decompression program stored in the ROM (ii) developing decompressed data in the RAM, thereby obtaining a command, the command including a specific instruction that is supplied from the host apparatus and referred to when the portable electronic medium is used after the issuance, and definition information based on the specific instruction and (iii) storing the definition information in the data memory;

second processing means for (i) decompressing the compressed data of the transmission data that the host apparatus provides at the time of issuance, by using the decompression program stored in the ROM (ii) developing decompressed data in the RAM, thereby obtaining a command, the command including a specific instruction that is supplied from the host apparatus and referred to when the portable electronic medium is used after issuance, and program data based on the specific instruction and (iii) storing the program data in the data memory;

read means for reading the definition information from the data memory based on the specific instruction the host apparatus provides, wherein the definition information being read when the portable electronic card is used after the issuance; and execution means for executing a process for enabling use of the portable electronic apparatus, by writing and reading data with reference to the data memory, using the definition information read out by the read means.

2. The portable electronic medium according to claim 1, wherein the portable electronic medium performs an identification process by using a master key that is stored in a hardware module when an IC chip to be incorporated is manufactured.

3. The portable electronic medium according to claim 1, wherein the portable electronic medium outputs a response code and a protocol control information each time one command is executed, the response code representing a result of execution.

4. A system for issuing a portable electronic medium configured to receive data from a host apparatus by serial communication and having a ROM, a RAM and a data memory, said ROM storing a decompression program which is used for decompressing compressed data included in transmission data supplied from the host apparatus at the time of issuance, said host apparatus comprising:

first transmission means for (i) generating a command including a specific instruction which is used when the portable electronic medium is issued, and definition information based on the specific instruction and (ii) transmitting compressed data, obtained by compressing the command, to the portable electronic medium; and second transmission means for (i) generating a command including a specific instruction and (ii) transmitting compressed data, obtained by compressing the command, to the portable electronic medium, and said portable electronic medium comprising:

first processing means for (i) decompressing the compressed data of transmission data the host apparatus transmits at the time of issuance, by using the decompression program stored in the ROM (ii) developing decompressed data in the RAM, thereby obtaining the command, wherein the command including the specific instruction that is supplied from the host apparatus and referred to when the portable electronic card is used after the issuance, and definition based on the specific instruction and (iii) storing the definition information in the data memory;

second processing means for (i) decompressing the compressed data of the transmission data that the host apparatus transmits at the time of issuance, by using the decompression program stored in the ROM (ii) developing decompressed data in the RAM, thereby obtaining the command, wherein the command including the specific instruction that is supplied from the host apparatus and referred to when the portable electronic card is used after the issuance, and program data based on the specific instruction and (iii) storing the program data in the data memory;

read means for reading the definition information from the data memory based on the specific instruction that the host apparatus provides, wherein the definition information being read when the portable electronic card is used after the issuance; and execution means for executing a process for enabling use of the portable memory medium by writing and reading data with reference to the data memory, using the definition information read out by the read means.

* * * * *